Patented Jan. 8, 1929.

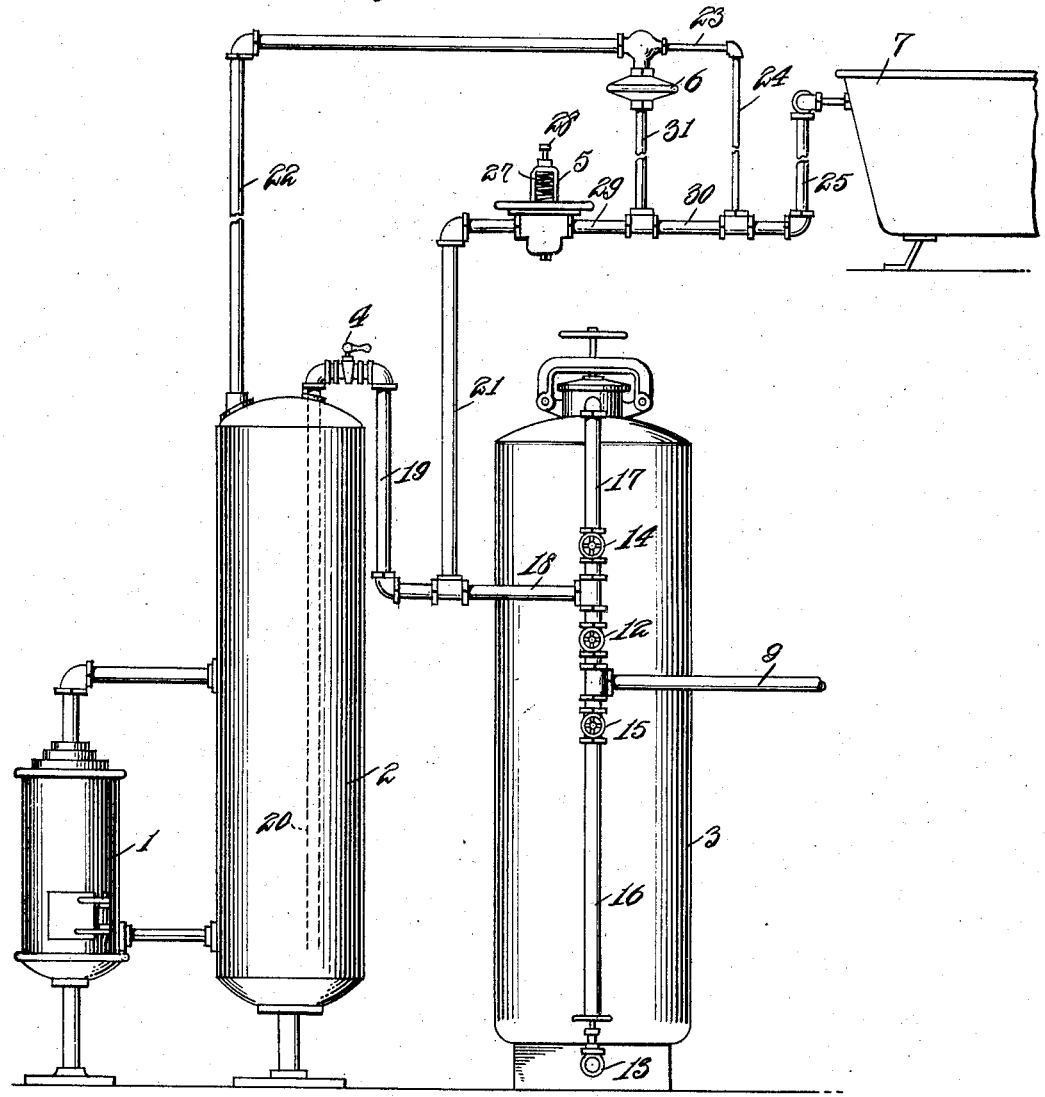

1,698,342

UNITED STATES PATENT OFFICE.

CHESTER T. McGILL, OF ELGIN, ILLINOIS, ASSIGNOR TO REITER COMPANY, OF ELGIN, ILLINOIS, A CORPORATION OF ILLINOIS.

HOT AND COLD WATER SINGLE-LINE SUPPLY SYSTEM.

Application filed June 15, 1926. Serial No. 116,201.

This invention relates to improvements in regulating the flow and supply of liquid through a single line of hot or cold water or different concentrated liquids to a bath tub or receiving vat by a valve control which regulates the pressure of the single line, the pressure causing the closing and opening of the regulating valve which supplies the different liquids or hot and cold water from two receptacles into one line.

An object of this invention is to provide means for supplying softened water, either hot or cold, through the same line or connection in any proportion desired, that is, the supply may be hot or cold or a mixture.

An object of this invention is to provide a means consisting of a base exchange water softener, a hot water tank, a heater, and a bath tub or other suitable connection combined in such a manner that different concentration of liquids may be carried through the same pipe line from two separate supplies under control at a remote distance by merely opening or closing suitable valves at the discharge point desired for the liquid.

A further object of this invention is to provide an apparatus for furnishing hot and cold soft water to bath tubs of the type common in residences, thereby leaving the regular cold water line for a supply of unsoftened water. In this connection it is stated that the majority of residences are at present equipped with a hot water line and a cold water line. The hot water supply lines lead from the hot water heater, the cold water leads direct from the city mains, while from the cold water lines lead the usual connections for the lavatories and the kitchen sink.

These connections make it possible to continue the use of the cold water lines for the raw cold water, or combine the hot water lines for the use of all hot soft water or all cold soft water, or a mixture of the two by means of a regulation control through the regular valves located at the usual places in the bath tub.

Other objects of this invention will appear in the following detailed description of the apparatus and as disclosed in the single sheet of drawings which is herewith made a part of this application.

In the drawings,

Fig. 1 illustrates a diagrammatic view of the flow regulator showing the connections, the bath tub, the water softener, hot water tank, and heater in assembled relationship.

Fig. 2 represents a plan view of a portion of the bath tub showing the regulating valves and connections in relationship thereto.

Numeral 1 designates the heater for the hot water tank 2, while numeral 3 represents a base exchange water softener and 7 a bath tub or other suitable receiving receptacle.

For convenience, it will be assumed that a city supply line 9 leading to the water softener 3 carries a nominal working pressure of 75 pounds and this pressure is maintained throughout the softener 3, the hot water heater 1, tank 2, and regulating valves 5 and 6 and all other pipe lines leading to the bath tub so long as there is no water being drawn through the valve controls 10 and 11.

In operation, the valves 12 and 13 are closed. The valves 14, 15 and 4 are open. The raw city water would pass through valve 15, line 16 into the bottom of tank 3, through the regular filtering and softening material and out of softener at the top through line 17, valve 14 into line 18. From the line 18, the water passes either to the hot water tank through line 19 and valve 4, where it is discharged near the bottom of the hot water tank 2, line 20, and that portion of the water desired softened but not heated, passes into line 21.

After the water has been heated by the heater 1, it passes out of the hot water tank 2, into lines 22, 23 and 24, which supplies the hot water beyond the choker valve 6. The lines 23 and 24 are of just sufficient capacity to supply a flow of water at the rate of one to four gallons per minute. The capacity of lines 23 and 24 are in harmony with the connection 26 to the valve 10 in the bath tub leading from the main water lines 25.

The valve control 10 will also, when opened, furnish water with the rate of flow from one to four gallons per minute. When valve 10 is opened wide, the hot water will travel through choker valve 6, lines 23, 24, 25 and 26. The reducing valve 5 is so adjusted and set by the regulating spring 27, and the adjustment screw 28, that cold water is prevented from passing from line 21, through the regulating valve 5 into lines 29 and 30, unless valve 11 is open. On account of the rate of flow through the valve 10 being so adjusted that unless more than 4 gallons of water per minute is drawn through line 25 into the bath tub, choker valve 6 will still remain open, but as soon as the cold water valve 11 is opened, this will allow an added amount of water to flow into the bath tub, more than can be supplied through the choker valve 6; in doing this, the pressure is reduced in lines 25, 23, 24, 30, 29 and 31, hence, releasing the pressure on the diaphragm in the choker valve 6 and causing the seat to close in valve 6, thereby shutting off the hot water from passing through valve 6 into the lines 23 and 24, that is, provided valve 11 is open wide enough to take a greater supply of water than four gallons per minute combined with whatever water passes out of valve 10.

In the event that valve 10 is open one-half, and valve 11 is open only enough to admit two gallons additional, then a portion of hot water will pass through the choker valve 6 into lines 23, 24 and 25, and a portion of cold water will pass through the regulating valve 5 into lines 29, 30 and 25. In the event that valve 11 is open wide, this will release the pressure in line 31, and choker valve 6 sufficiently to shut choker valve 6 entirely, which will then supply the entire flow of water through the regulating valve 5 from the line 21. This takes the supply of water entirely from cold water line 21, reducing valve 5 into lines 29, 30, and 25 and thence to the bath tub.

When a sufficient amount of cold water is obtained, the usual and natural thing for the operator to do, would be to close valve 11. This in turn would reduce the rate of flow to the capacity of valve 10 which is from one to four gallons per minute, depending upon the amount this valve is open and with water flowing through line 25 at a rate of less than four gallons per minute, allows a sufficient amount of city pressure to build up in line 29, which reacts in line 31, and on the diaphragm in the choker valve 6 and causes this valve 6 to open, thereby permitting hot water to pass through the choker valve 6 into the regular lines 23, 24, and 25 and at the same time, creates sufficient pressure in line 29, reducing valve 5 to cause valve 5 to close and discontinue supplying cold water from line 21.

If cold water is desired, right at the start, and the bath tub has not been used for some time, the water even though it was hot at one time in lines 23, 24 and 25, would have lost the temperature and be cold or practically cold and by opening the cold water valve 11, it would release the pressure in lines 31 and 29 and hence to choker diaphragm in valve 6 and the regulating valve 5 sufficiently to close the valve 6 and open the regulating valve 5 and supply a continual flow of cold water, so long as valve 11 was left open.

It will be understood that valve 11 may be so located that at least four gallons a minute would be supplied from this valve, even though the valve was only partially opened.

It will also be noted that valve 10, even though it is wide open would not furnish a greater amount of water than four gallons per minute.

When the operator has opened valve 10 wide, which furnishes water entirely from line 22 through choker valve 6 into lines 23, 24 and 25, hot water is furnished from the hot water tank 2. In the event the water is too hot, and the operator desires to reduce the temperature, valve 11 is open and if opened enough to supply up to two gallons of water per minute, the additional amount of water being taken entirely from line 25, will reduce the pressure in lines 30, 31 and 29 sufficiently to partially close choker valve 6 and partially open reducing valve 5. The reduced flow of water will pass from line 22 to choker valve 6 into lines 23 and 24, into line 25 and the cold water passing through reducing valve 5 from the line 21 will enter lines 29 and 30 and into line 25 with the hot water to the bath. As substantially stated above, when valve 10 is closed and the operator opens valve 11 just wide enough to supply four gallons of water per minute, hot water would pass into the bath tub through valve 11, cold water will only be furnished in part and entirely when valves 10 and 11 are opened wide enough to admit more than four gallons per minute. The choker valve 6 and reducing valve 5 may be adjusted for four gallons per minute or six or any amount of water.

The unfiltered raw water enters from the city mains into line 9 and passes through valve 15, line 16 into the bottom portion of the softener through a bed of filtering material, similar to the softening apparatus disclosed in this applicant's copending case, Serial No. 70,154 filed November 19, 1925. This filtering material filters the suspended matter from the water, the water passing up through a bed of base exchange zeolite material where the hardness, calcium carbonate, is absorbed by the zeolite mineral and the water passes through this mineral into the fill nozzle where it is again filtered. The soft water then passes into line 17 through valve 14 and line 18 where it either supplies the cold soft water line 21, to the reducing valve 5, or it supplies the hot water tank 2, through line 19 and valve 4 and hence is heated in the heater 1 and passes through the hot water tank 2 into the hot water soft line 22.

In operation, this invention provides a means for supplying all hot softened water or softened cold water, or a mixture of the two, to a bath tub or other suitable receptacle by means of a valve control regulated in the bath tub, the hot or cold water being supplied through the same line.

It will require but little skill to operate the equipment as set forth in this invention. The party using the bath would open the hot water valve in the usual way and secure hot water, and when desiring cold water, would open the cold water valve, and in the event that he opened the cold water valve, for instance, only part way, the party would receive a mixure of hot and cold soft water, the proportions depending on the amount the cold water valve was opened, the same as it would in the ordinary hot and cold water line connections.

What I claim is:

1. In a hot and cold water system, comprising a base exchange water softener, a hot water tank, a heater, a tub, suitable valve and a line connections thereto, including a single supply line to the tub, means for supplying hot and cold water to the tub through the same supply line in any proportion desired, consisting of a choker valve and a reducing valve in the line connections, and suitably placed supply valves on the single supply line leading to the tub.

2. In a hot and cold water system, comprising a base exchange water softener, a hot water tank, a heater, a tub, suitable valve and line connections thereto, including a single supply line to the tub, means for supplying hot and cold water to the hub through the same supply line in any proportion desired, consisting of a choker valve and a reducing valve in the line connections, and suitably placed supply valves on the single supply line leading to the tub, one of the supply valves being adapted to supply water at a faster rate than the other supply valve thereby making it possible to maintain a flow of hot water or a flow of cold water through the single supply line to the tub.

3. In a hot and cold water system, comprising a base exchange water softener, a hot water tank, a heater, a tub, suitable valve and line connections thereto, including a single supply line to the tub, means for supplying hot and cold water to the tub through the same supply line in any proportion desired, consisting of a choker valve and a reducing valve in the line connections, and suitably placed supply valves on the single supply line leading to the tub, one of the supply valves being adapted to supply water at a faster rate than the other supply valve, thereby making it possible to maintain a flow of hot water or a flow of cold water through the single supply line to the tub, one of the supply valves being adapted to furnish hot water through the choker valve whenever desired.

4. The combination with a hot and cold water system, of a base exchange water softener, a hot water tank, a heater, a bath tub, a single pipe line leading from the hot and cold water supply pipe lines, having regulating valves at one end and two discharge water pipe lines with manually operated valves at the other end, and operative means for controlling the supply of hot and cold water as desired through the single line consisting of the manually operated valves.

5. The combination with a hot and cold water system, of a base exchange water softener, a hot water tank, a heater, a bath tub, a single pipe line leading from the hot and cold water supply pipe lines, having regulating valves at one end and two discharge water pipe lines at the other end, and operative means for controlling the supply of hot and cold water as desired through the single line consisting of manually operated valves, the single line lying between the regulating valves and the manually operating valves.

6. In a system, a plurality of liquid supply elements, a receiving receptacle for the liquids, a suitable valve means and connections thereto including a single supply line to the receptacle, and means for supplying liquids from the supply elements to the receptacle, through the single supply line, in any proportion desired.

7. In combination with a liquid supply system, means for regulating the character of the liquid supply as desired from the source of supply into a single pipe line under control at the point of discharge of the single line.

8. In combination with a liquid supply system, means for supplying liquids as desired from the supply system leading into one line and under control by the rate of flow at the discharge point.

9. In combination with a liquid supply system, means for supplying liquids from the supply system leading from one line and being under valve control at the discharge point, thereby operating to furnish the proper proportion of liquid as desired.

In testimony whereof I affix my signature.

CHESTER T. McGILL.